United States Patent
Zhang

(10) Patent No.: US 11,603,098 B2
(45) Date of Patent: Mar. 14, 2023

(54) SYSTEMS AND METHODS FOR EYE-TRACKING DATA COLLECTION AND SHARING

(71) Applicant: GM GLOBAL TECHNOLOGY OPERATIONS LLC, Detroit, MI (US)

(72) Inventor: Yunxiu Zhang, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 468 days.

(21) Appl. No.: 16/552,458

(22) Filed: Aug. 27, 2019

(65) Prior Publication Data

US 2021/0061277 A1  Mar. 4, 2021

(51) Int. Cl.
| | |
|---|---|
| *B60W 30/18* | (2012.01) |
| *B60W 10/18* | (2012.01) |
| *B60W 10/20* | (2006.01) |
| *B60W 10/04* | (2006.01) |
| *B60W 40/08* | (2012.01) |

(52) U.S. Cl.
CPC ............ *B60W 30/18* (2013.01); *B60W 10/04* (2013.01); *B60W 10/18* (2013.01); *B60W 10/20* (2013.01); *B60W 40/08* (2013.01); *B60W 2710/18* (2013.01); *B60W 2710/20* (2013.01); *B60W 2720/106* (2013.01); *B60W 2756/10* (2020.02)

(58) Field of Classification Search
CPC ...... B60W 30/18; B60W 10/18; B60W 10/20; B60W 10/04; B60W 40/08; B60W 2756/10; B60W 2720/106; B60W 2710/18; B60W 2710/20; B60W 30/0953; B60W 2540/225; B60W 2556/65; B60W 2420/42; B60W 50/0097; B60W 10/184; B60W 10/06; B60W 40/105; B60W 40/107; B60W 60/001; B60W 2510/20; B60W 2520/10; B60W 2520/105; B60W 2552/50; B60W 2710/0605; G08C 17/02
USPC .......................................................... 701/41
See application file for complete search history.

(56) References Cited

U.S. PATENT DOCUMENTS

| | | | |
|---|---|---|---|
| 2010/0235035 A1* | 9/2010 | Nishira | ..................... B60T 7/22 701/31.4 |
| 2012/0134576 A1* | 5/2012 | Sharma | ................ G06K 9/6249 382/206 |
| 2012/0287282 A1* | 11/2012 | Kinoshita | .............. H04N 7/181 348/148 |

(Continued)

*Primary Examiner* — Jonathan M Dager
*Assistant Examiner* — Jean W Charleston
(74) *Attorney, Agent, or Firm* — Quinn IP Law

(57) ABSTRACT

A method for collecting and mapping eye movement data to vehicle data includes providing a vehicle having a plurality of sensors configured to capture vehicle characteristic data, an eye-movement tracking system configured to capture eye movement data, a wireless communication system, and a controller in communication with the plurality of sensors, the eye movement tracking system, and the wireless communication system, receiving the eye movement data and the vehicle characteristic data, analyzing the eye movement data and the vehicle characteristic data to temporally correlate the eye movement data and the vehicle characteristic data and generate a matched dataset, determining a predicted vehicle maneuver from the matched dataset, and transmitting the predicted vehicle maneuver to a nearby vehicle using V2X communication.

20 Claims, 5 Drawing Sheets

(56) References Cited

U.S. PATENT DOCUMENTS

| | | | |
|---|---|---|---|
| 2013/0179382 A1* | 7/2013 | Fritsch | B60W 50/14 |
| | | | 706/46 |
| 2014/0313124 A1* | 10/2014 | Kim | G06V 40/18 |
| | | | 345/156 |
| 2016/0031321 A1* | 2/2016 | Ono | B60W 30/095 |
| | | | 701/41 |
| 2017/0131719 A1* | 5/2017 | Micks | G06V 20/584 |
| 2018/0225963 A1* | 8/2018 | Kobayashi | G08G 1/09 |
| 2019/0064823 A1* | 2/2019 | Jiang | G05D 1/0066 |
| 2019/0079518 A1* | 3/2019 | Arakawa | B60W 50/082 |
| 2019/0088135 A1* | 3/2019 | Do | G05D 1/0088 |
| 2019/0317511 A1* | 10/2019 | Xu | B60W 30/0956 |
| 2020/0005060 A1* | 1/2020 | Martin | G06V 40/197 |
| 2020/0017124 A1* | 1/2020 | Camhi | B60W 10/08 |

\* cited by examiner

SYSTEMS AND METHODS FOR EYE-TRACKING DATA COLLECTION AND SHARING

INTRODUCTION

The present disclosure relates generally to systems and methods for collecting and mapping eye movement data and sharing the information with surrounding vehicles to improve predictions of intended vehicle maneuvers.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Typically, autonomous or semi-autonomous vehicles do not have a way to predict the maneuvers of surrounding vehicles. Vehicle-to-everything (V2X) communication is the passing of information from a vehicle to any entity that may affect the vehicle, and vice versa. V2X is a vehicular communication system that incorporates other, more specific types of communication such as vehicle-to-infrastructure (V2I), vehicle-to-network (V2N), vehicle-to-vehicle (V2V), vehicle-to-pedestrian (V2P), and vehicle-to-grid (V2G). Eye tracking is the process of measuring either the point of gaze (where one is looking) or the motion of an eye relative to the head. Methods and systems to collect eye gaze information, map the information to the surrounding environment, and share the information with surrounding vehicles can be used to inform the intent of an autonomous, semi-autonomous, or driver-operated vehicle.

SUMMARY

Embodiments according to the present disclosure provide a number of advantages. For example, embodiments according to the present disclosure enable collection of eye-movement data, correlation of the eye-movement data to vehicle operating data, prediction of an intended vehicle maneuver based on the correlated data, and transmission of the prediction and instructions via V2X communication to nearby vehicles and infrastructure.

In one aspect of the present disclosure, a method for collecting and mapping eye movement data to vehicle data includes providing a vehicle. The vehicle includes a plurality of sensors configured to capture vehicle characteristic data, an eye-movement tracking system configured to capture eye movement data, a wireless communication system, and a controller in communication with the plurality of sensors, the eye movement tracking system, and the wireless communication system. The method includes receiving, by the controller, the eye movement data and the vehicle characteristic data, analyzing, by the controller, the eye movement data and the vehicle characteristic data to temporally correlate the eye movement data and the vehicle characteristic data and generate a matched dataset, determining, by the controller, a predicted vehicle maneuver from the matched dataset, and transmitting, by the controller and the wireless communication system, the predicted vehicle maneuver to a nearby vehicle using V2X communication.

In some aspects, the method further includes receiving, by the controller, vehicle environment data from the plurality of sensors to establish a current vehicle environment, comparing, by the controller, the vehicle environment data and the predicted vehicle maneuver to determine if a first condition is satisfied, and, in response to satisfaction of the first condition, generating, by the controller, a notification signal.

In some aspects, the method further includes, in response to satisfaction of the first condition, generating, by the controller, a vehicle control signal.

In some aspects, the vehicle control signal includes one or more of a vehicle braking control signal, a vehicle steering control signal, and a vehicle throttling control signal.

In some aspects, the vehicle environment data includes locations of one or more obstacles in the current vehicle environment.

In some aspects, the first condition is satisfied in response to a determination by the controller that the predicted vehicle maneuver avoids the one or more obstacles identified in the current vehicle environment.

In some aspects, the notification signal includes instructions related to performing the predicted vehicle maneuver.

In some aspects, the eye-movement tracking system includes a virtual grid for determining a gaze position and the method includes correlating, by the controller, the gaze position with the vehicle environment data and the vehicle characteristic data.

In some aspects, the vehicle characteristic data includes a vehicle speed, a vehicle acceleration, and a vehicle steering wheel angle.

In some aspects, the matched dataset includes the gaze position, a duration of the gaze position, the vehicle speed, the vehicle acceleration, the vehicle steering wheel angle, and a vehicle position.

In another aspect of the present disclosure, an automotive vehicle includes a body defining a passenger compartment and including a front windshield area, the body enclosing a propulsion system, a braking system, a steering system, and a wireless communication system, an eye-movement tracking system configured to capture eye movement data and including a virtual grid covering the front windshield area, a plurality of sensors configured to capture vehicle characteristic data, and a controller in communication with the plurality of sensors, the eye movement tracking system, and the wireless communication system. The controller is configured to receive the eye movement data and the vehicle characteristic data, analyze the eye movement data and the vehicle characteristic data to temporally correlate the eye movement data and the vehicle characteristic data and generate a matched dataset, determine a predicted vehicle maneuver from the matched dataset, and transmit, using the wireless communication system, the predicted vehicle maneuver to a nearby vehicle using V2X communication.

In some aspects, the controller is further configured to receive vehicle environment data from the plurality of sensors to establish a current vehicle environment, wherein the vehicle environment data includes locations of one or more obstacles in the current vehicle environment, compare the vehicle environment data and the predicted vehicle maneuver to determine if a first condition is satisfied, and in response to satisfaction of the first condition, generate a notification signal and a vehicle control signal.

In some aspects, the vehicle control signal includes one or more of a vehicle braking control signal, a vehicle steering control signal, and a vehicle throttling control signal.

In some aspects, the first condition is satisfied in response to a determination by the controller that the predicted vehicle maneuver avoids the one or more obstacles identified in the current vehicle environment.

In some aspects, the notification signal includes instructions related to performing the predicted vehicle maneuver.

In yet another aspect of the present disclosure, a system for collecting and mapping eye movement data to vehicle data of a vehicle includes an eye-movement tracking system configured to capture eye movement data, a plurality of sensors configured to capture vehicle characteristic data, and a controller in communication with the plurality of sensors and the eye movement tracking system. The controller is configured to receive the eye movement data and the vehicle characteristic data, analyze the eye movement data and the vehicle characteristic data to temporally correlate the eye movement data and the vehicle characteristic data and generate a matched dataset, and determine a predicted vehicle maneuver from the matched dataset.

In some aspects, the controller is further configured to receive vehicle environment data from the plurality of sensors to establish a current vehicle environment, compare the vehicle environment data and the predicted vehicle maneuver to determine if a first condition is satisfied and, in response to satisfaction of the first condition, generate one or more of a notification signal and a vehicle control signal.

In some aspects, the vehicle control signal includes one or more of a vehicle braking control signal, a vehicle steering control signal, and a vehicle throttling control signal.

In some aspects, the first condition is satisfied in response to a determination by the controller that the predicted vehicle maneuver may be performed in the current vehicle environment.

In some aspects, the notification signal includes instructions related to performing the predicted vehicle maneuver.

BRIEF DESCRIPTION OF THE DRAWINGS

The present disclosure will be described in conjunction with the following figures, wherein like numerals denote like elements.

Figure 1:
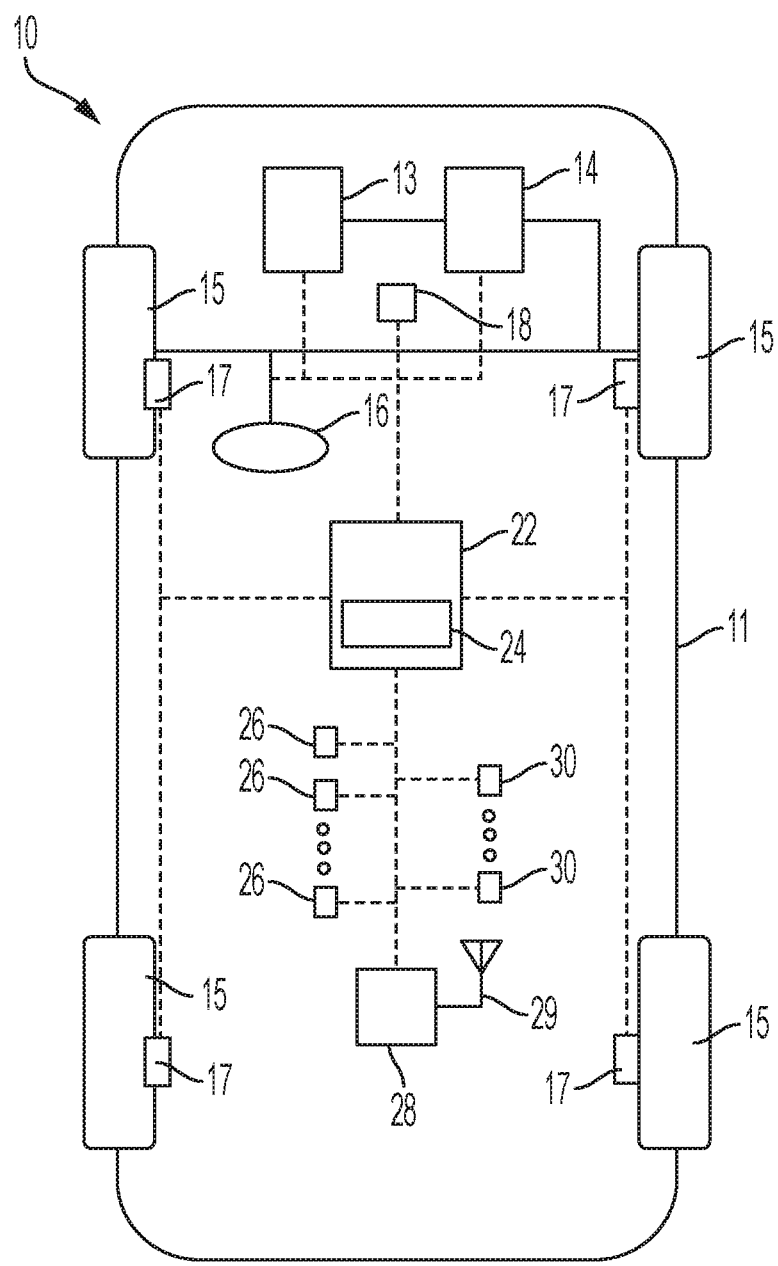
FIG. 1 is a schematic diagram of a vehicle, according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 includes a propulsion system 13, which may in various embodiments include an internal combustion engine, an electric machine such as a traction motor, and/or a fuel cell propulsion system.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

In various embodiments, the vehicle 10 also includes a wireless communication system 28 configured to wirelessly communicate with any wireless communication equipped device (vehicle-to-everything or "V2X"), including other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure. Additionally, wireless communication systems configured to communicate with traffic lights, cellular towers or relays, etc. using LTE, 5G, and other communication standards, are also considered within the scope of the present disclosure. In various embodiments, the wireless communication system 28 includes one or more antennas 29 configured to receive and transmit wireless communication signals. In various embodiments, the one or more antennas are directional antennas.

The propulsion system 13, transmission 14, steering system 16, and wireless communication system 28 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In various embodiments, the vehicle 10 includes an eye-movement tracking system 18. The eye-movement tracking system 18 includes one or more eye-tracking devices known to those skilled in the art to capture eye-movement data corresponding to the operator's eye movements within the vehicle. The eye-movement tracking system 18 is in communication with the controller 22. In various embodiments, the controller 22 includes an eye-movement data analysis system 24 for receiving and analyzing signals and messages received via the eye-movement tracking system 18. The controller 22 receives the eye-movement data and analyzes this data to map the operator's eye movement with vehicle data including vehicle speed, acceleration, steering wheel angle, GPS position, etc., for example and without limitation.

In various embodiments, the controller 22 is configured to automatically control the propulsion system 13, transmission 14, steering system 16, and wheel brakes 17 via one or more vehicle control modules to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate to capture vehicle characteristic or operating conditions including, for example and without limitation, vehicle speed, acceleration, and steering wheel angle.

Typically, vehicles, whether autonomous or semi-autonomous, do not have a way to predict the maneuvers of surrounding autonomous, semi-autonomous, or driver-operated vehicles. The systems and methods discussed herein enable real-time capture and matching of eye-movement data that may be shared with surrounding vehicles using V2X communications. The eye-movement data may be used to improve operator- or vehicle-intention predictions and/or to improve vehicle control strategies.

Figure 2:
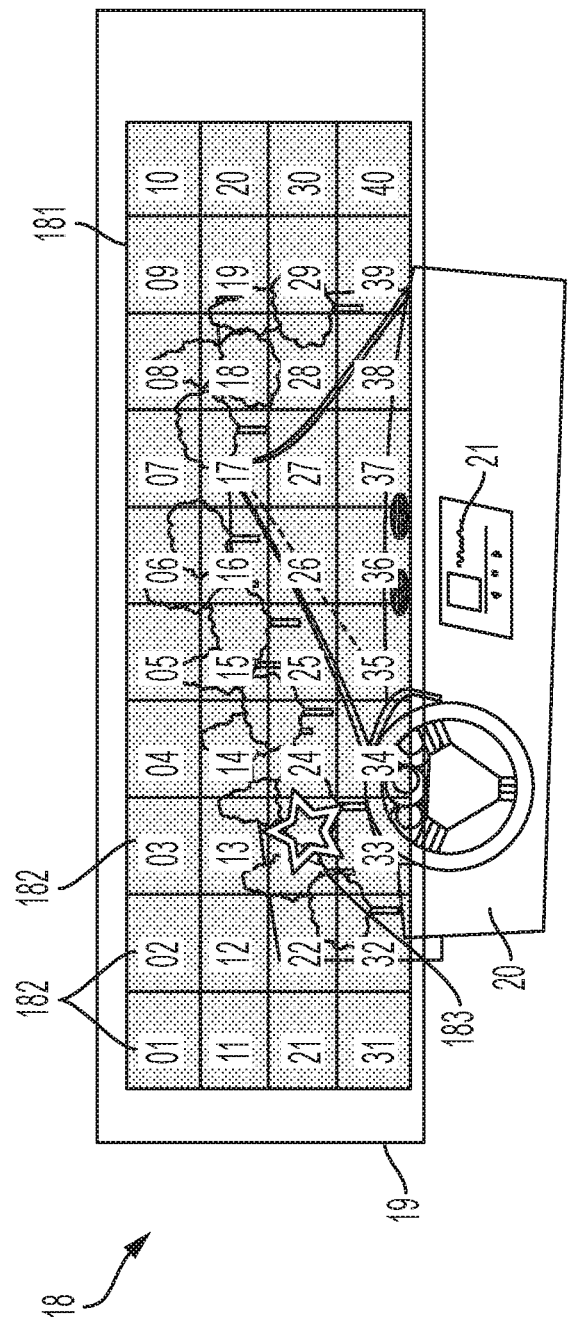
FIG. 2 is a schematic diagram of an eye-movement tracking system, according to an embodiment of the present disclosure.

FIG. 2 is a schematic illustration of components of the eye-movement tracking system 18 of the vehicle 10, according to an embodiment. The eye-movement tracking system 18 includes, in some embodiments, a virtual grid 181 that covers the front windshield area, and, in some embodiments, the side view mirrors of the vehicle 10. The virtual grid 181 is divided into a plurality of grid areas 182. The grid areas 182 are uniquely identified with a marker, such as a number, letter, or any combination forming a unique identification of the location of the grid area 182.

As shown the virtual grid 181 may be mapped to cover the area of a front windshield 19 of the vehicle 10, above a vehicle dashboard 20 that may include the steering wheel of the steering system 16 and a vehicle information system 21. The front windshield 19 offers a view of the environment forward and surrounding the vehicle 10, as illustrated in FIG. 2.

In various embodiments, eye tracking devices mounted within the passenger compartment of the vehicle 10 including, for example and without limitation, one or more eye tracking cameras or other eye tracking sensors in communication with the eye-movement tracking system 18, detect a gaze position of the vehicle operator, indicated by the star 183. The gaze position 183 is mapped onto the virtual grid 181 and associated with a corresponding grid area 182. In various embodiments, the corresponding grid area 182 information is transmitted to the controller 22 to be analyzed by the eye-movement data analysis system 24. In various embodiments, a series of gaze positions (that is, eye gaze tracking data) are recorded and analyzed by the eye-movement data analysis system 24 to identify patterns of eye movement that indicate an intended vehicle operation.

In various embodiments, the eye-movement tracking system 18 also includes a timer. The timer may be incorporated into the controller 22, the eye-movement tracking system 18, or may be in communication with one or both of the controller 22 and the eye-movement tracking system 18. The timer measures a duration of the operator's gaze at the corresponding grid area 182. In various embodiments, the eye-movement tracking system 18 measures the gaze position and gaze duration of the vehicle operator's gaze at regular intervals, e.g., 100 ms, for example and without limitation.

Vehicle data acquired by one or more of the sensors 26 including, for example and without limitation, vehicle speed, acceleration, steering wheel angle, navigation data including positioned determined using GPS, etc. is acquired simultaneously. For example, vehicle data having the same time stamp as the gaze position and duration data is acquired by the sensors 26 and received by the controller 22 for use by the eye-movement data analysis system 24.

Figure 3:
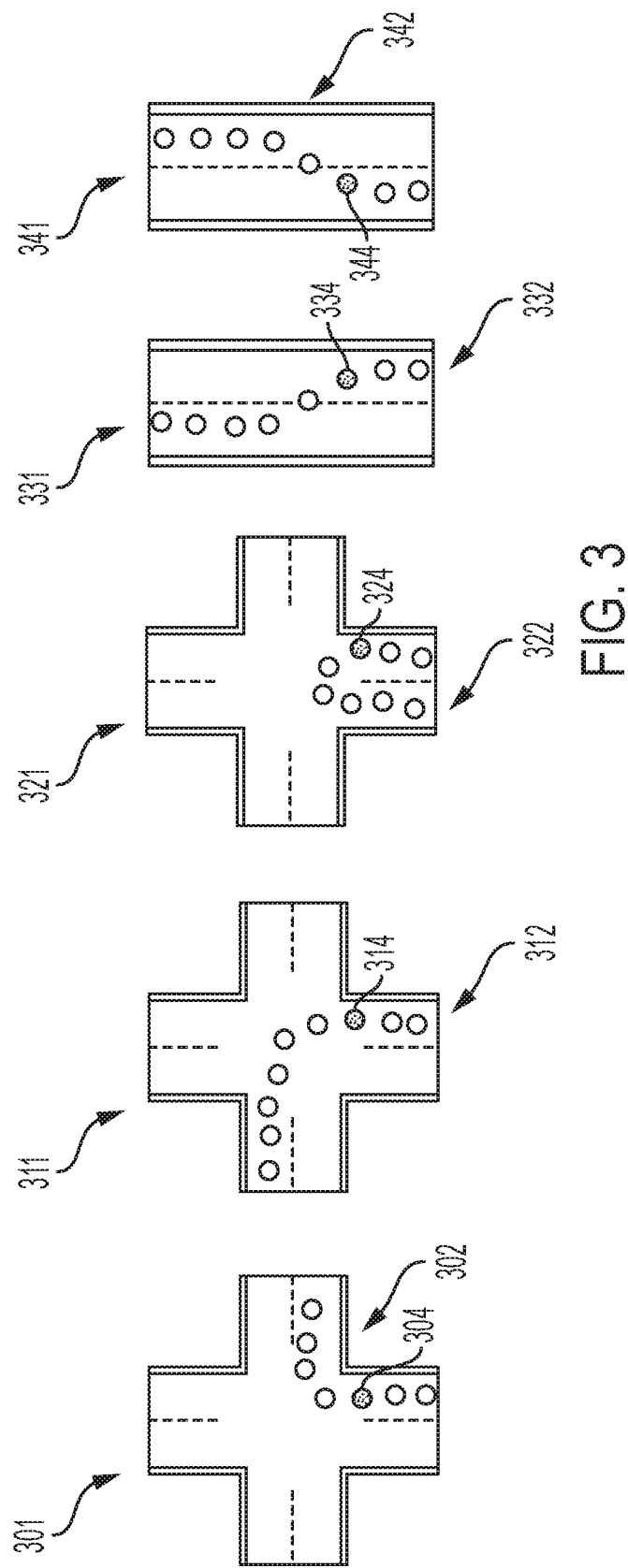
FIG. 3 is a schematic diagram of five possible vehicle maneuvers that may be predicted using an eye-movement tracking system, according to an embodiment of the present disclosure.

As shown in FIG. 3, several examples of vehicle maneuvers are illustrated at 301, 311, 321, 331, 341. Each of the vehicle maneuvers 301, 311, 321, 331, 341 has associated vehicle data including, for example and without limitation, vehicle speed, acceleration, steering wheel angle, GPS position, etc. The controller 22 receives the vehicle data and analyzes the data to identify vehicle driving behavior. For example, the controller 22 receives vehicle data 302, 312, 322, 332, 342 associated with each of the maneuvers 301, 311, 321, 331, 341. The vehicle data 302, 312, 322, 332, 342 is vehicle data acquired in regular intervals, in some embodiments, acquired at the same intervals as the gaze position and duration data acquired by the eye-movement tracking system 18.

The controller 22 analyzes the data and determines a start point of each maneuver, such as the start point 304 of the maneuver 301. The start point 304 of the maneuver 301 is flagged by the controller 22 as the operator intention point, that is, the point at which the operator's intention is identified. For example, the start point 304 of maneuver 301 indicates that the operator intends to perform a right-hand turn. Similarly, the start point 314 of maneuver 311 indicates that operator intends to perform a left-hand turn. Continuing with maneuver 321, the start point 324 indicates that the operator intends to perform a U-turn. The start point 334 of maneuver 331 indicates that the operator intends to perform a lane change from the right lane to the left lane and the start point 344 of the maneuver 341 indicates that the operator intends to perform a lane change from the left lane to the right lane.

Figure 4:
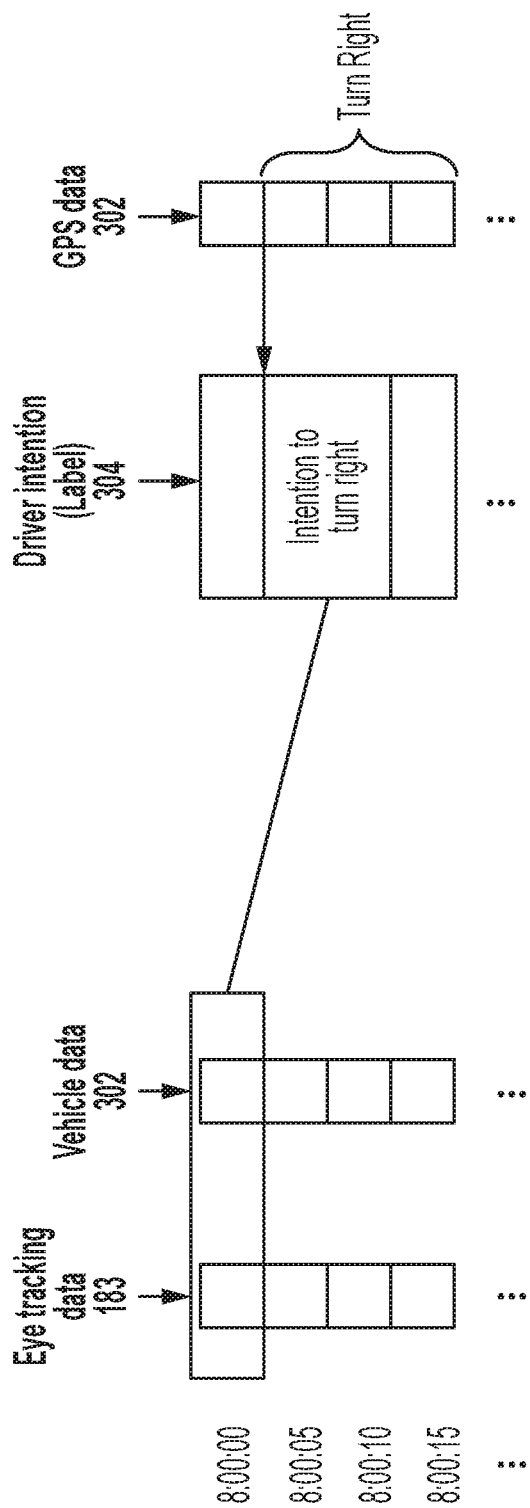
FIG. 4 is a schematic diagram of eye-movement data mapping and correlation to vehicle data, according to an embodiment of the present disclosure.

Once acquired by the eye-movement tracking system 18, the gaze position and duration data is correlated with the vehicle data to generate a matched dataset, as shown in FIG. 4. At each time interval, the gaze position data 183 is correlated with vehicle data 302. The GPS or navigation data, included in the vehicle data 302, indicates the position of the vehicle at each measured time interval. In various embodiments, the operator intention point of the maneuver, such as the start point 304 of the right turn maneuver 301, is identified at a predetermined time interval prior to the start of the maneuver shown by the GPS vehicle data 302. In various embodiments, the predetermined time interval is approximately 5 (five) seconds.

In various embodiments, the correlated gaze position and duration data and vehicle data is analyzed by the eye-movement data analysis system 24 of the controller 22 of the vehicle 10. This analysis includes, in some embodiments, use of a prediction model. The prediction model analyzes a percentage of the eye gaze tracking and vehicle data as training datasets to predict an intended maneuver and performs validation of the prediction model using additional eye gaze tracking data and vehicle data as acquired to refine the prediction of the intended maneuver. In various embodiments, the prediction model is housed in the originating vehicle 10. In various embodiments, the prediction model is housed in the receiving vehicle 10, that is, a nearby vehicle to the originating vehicle that receives the gaze position and duration data and vehicle data from the originating vehicle 10.

The operator intention point and the data associated with the predicted maneuver, such as the data 304, is transmitted, in some embodiments, to nearby vehicles or other infrastructure using V2X via the wireless communication system 28. In various embodiments, the predicted maneuver information is transmitted using V2X to surrounding vehicles and infrastructure. In other embodiments, the eye-movement tracking data, such as the data associated with the gaze position 183 and the associated vehicle data, such as the data 302, is transmitted to nearby vehicles or other infrastructure using V2X to be analyzed by the receiving vehicle to predict the operator's intended maneuver of the originating vehicle. The receiving vehicle is, in some embodiments, a vehicle similar to vehicle 10 that is an autonomous or semi-autonomous vehicle configured to receive the data regarding the operator's intended maneuver of the originating vehicle 10, analyze the data, predict the intended maneuver, and generate one or more control signals to control steering, braking, and throttle of the receiving vehicle to accommodate the predicted maneuver of the originating vehicle.

Figure 5:
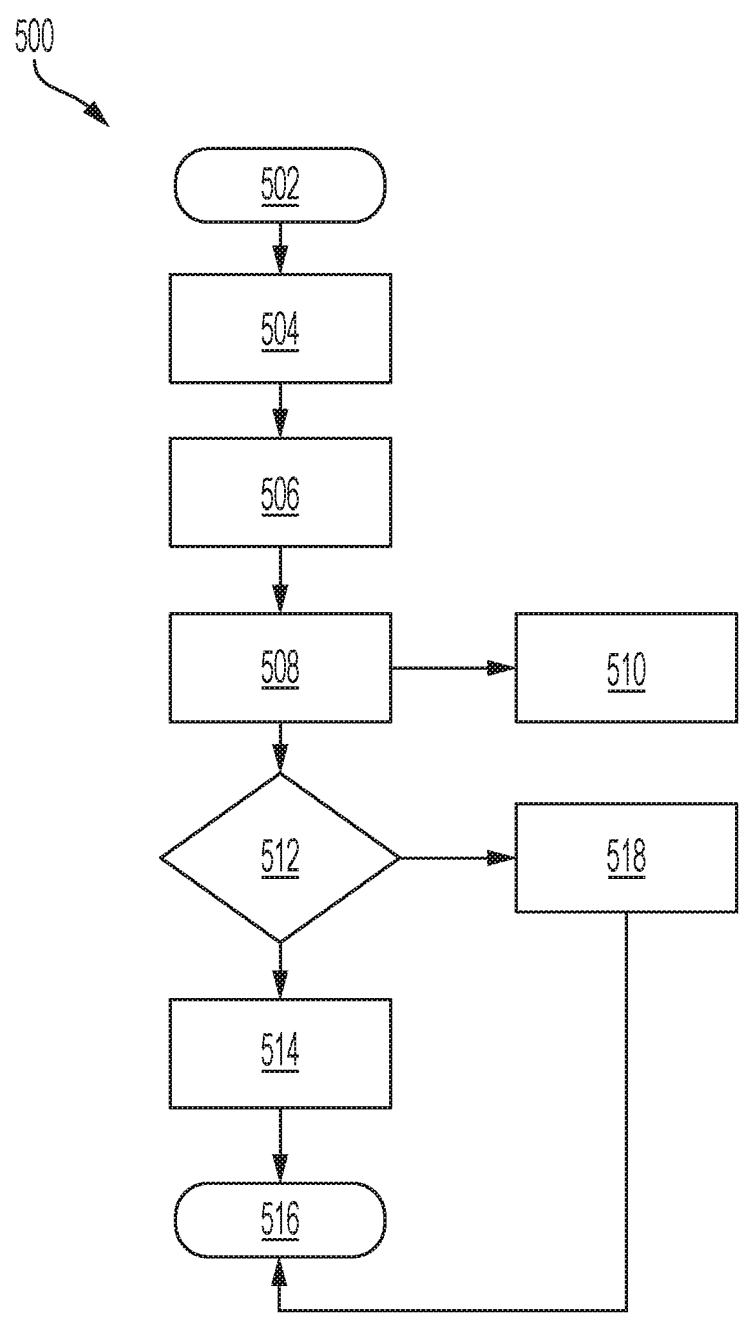
FIG. 5 is a flow diagram of a method for collecting and sharing eye-movement data using V2X communication, according to an embodiment of the present disclosure.

FIG. 5 illustrates a method 500 to collect eye movement data and map the data to vehicle data, including GPS data, to predict an operator's intended vehicle maneuver, according to an embodiment. The method 500 can be utilized in connection with the vehicle 10 and the controller 22, including the eye-movement data analysis system 24 and the eye-movement tracking system 18. The method 500 can be utilized in connection with the controller 22 as discussed herein, or by other systems associated with or separate from the vehicle, in accordance with exemplary embodiments. The order of operation of the method 500 is not limited to the sequential execution as illustrated in FIG. 5, but may be performed in one or more varying orders, or steps may be performed simultaneously, as applicable in accordance with the present disclosure.

Beginning at 502, the method 500 proceeds to 504. At 504, the controller 22 receives real-time eye gaze position data from the eye-movement tracking system 18.

Next, at 506, the eye-movement data analysis system 24 analyzes the eye gaze position data and matches the eye gaze position data with vehicle data including vehicle speed, acceleration, steering wheel angle, GPS position, etc., for example and without limitation. The eye gaze position data and the matched vehicle data is also temporally aligned such that the eye gaze position data and vehicle data relate to the same point in time. In various embodiments, the, at least 1 (one) to 5 (five) seconds of eye gaze position data is matched with vehicle data.

The method 500 continues to 508, in which the matched eye gaze position data and vehicle data is analyzed by the controller 22 to predict the operator intention, such as, for example and without limitation, whether the data indicates that the operator intends to direct the vehicle to perform one of the maneuvers shown in FIG. 3.

The operator intention prediction data and result are transmitted, in some embodiments, to a nearby vehicle or other communication target via V2X communication, as shown by step 510. In some embodiments, the operator intention prediction data and result are analyzed by the receiving vehicle or other receiving target to modify, adjust, and/or adapt behavior to accommodate the predicted intended motion of the transmitting vehicle.

From 508, the method 500 proceeds to 512. At 512, in some embodiments, the controller 22 receives additional current vehicle environment data from one or more of the sensors 26 to establish a current vehicle environment. In various embodiments, the current vehicle environment includes the location of obstacles such as trees, poles, etc., roadway features such as signs, lane markers, etc., and nearby vehicles relative to the operator's vehicle or the vehicle intending to perform the predicted maneuver, for example and without limitation. The controller 22 analyzes the additional current vehicle environment data and compares the operator intention prediction data and result with the additional vehicle environment data to determine if a first condition is satisfied, that is, the predicted maneuver may be performed in the current vehicle environment and avoids one or more obstacles identified in the current vehicle environment.

In response to satisfaction of the first condition, that is, the predicted maneuver may be performed in the current environment, the method 500 proceeds to 514. In some embodiments, at 514, the controller 22 generates and transmits a notification signal to the vehicle operator confirm that the predicted maneuver may be performed. In various embodiments, the notification signal includes instructions for how to perform the maneuver smoothly. In some embodiments, for autonomous or semi-autonomous vehicles 10, at 514, the controller 22 generates and transmits one or more control signals to one or more of the actuators 30 to control one or more of vehicle steering, braking, and throttling to automatically perform the intended maneuver and/or adjust one or more of vehicle steering, braking, and throttling to adjust the vehicle operating condition to more accurately perform the intended maneuver carried out by the operator to avoid obstacles identified in the current vehicle environment data. From 514, the method 500 proceeds to 516 and ends.

When the controller 22 determines that the first condition is not satisfied, that is, performance of the predicted maneuver is not safe given the current environment conditions (for example, the predicted maneuver would result in a collision or near-collision with another vehicle or nearby object), the method 500 proceeds to 518. At 518, the controller 22 generates and transmits a notification signal to the vehicle operator to notify or warn the operator that the predicted maneuver is not safe or okay to perform. In some embodiments, for autonomous or semi-autonomous vehicles 10, at 518, the controller 22 generates and transmits one or more control signals to one or more of the actuators 30 to control one or more of vehicle steering, braking, and throttling to control the vehicle 10 to prevent performance of the intended maneuver and/or avoid obstacles identified in the current vehicle environment data. From 518, the method 500 proceeds to 516 and ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantifies, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for collecting and mapping eye movement data to vehicle data, comprising:
   providing a vehicle having a front windshield area, a plurality of sensors configured to capture vehicle characteristic data, an eye-movement tracking system configured to capture eye movement data, a wireless communication system, and a controller in communication with the plurality of sensors, the eye movement tracking system, and the wireless communication system, wherein the eye-movement tracking system includes a virtual grid divided into a plurality of uniquely identified grid areas for determining a gaze position;
   mapping, by the controller, the virtual grid to cover the front windshield area;
   receiving, by the controller, the eye movement data, including the gaze position, and the vehicle characteristic data;
   analyzing, by the controller, the eye movement data and the vehicle characteristic data to temporally correlate the eye movement data and the vehicle characteristic data and generate a matched dataset;
   determining, by the controller, a predicted vehicle maneuver from the matched dataset; and
   transmitting, by the controller and the wireless communication system, the predicted vehicle maneuver to a nearby vehicle using V2X communication.

2. The method of claim 1 further comprising:
   receiving, by the controller, vehicle environment data from the plurality of sensors to establish a current vehicle environment;
   comparing, by the controller, the vehicle environment data and the predicted vehicle maneuver to determine if a first condition is satisfied; and
   in response to satisfaction of the first condition, generating, by the controller, a notification signal.

3. The method of claim 2 further comprising, in response to satisfaction of the first condition, generating, by the controller, a vehicle control signal.

4. The method of claim 3, wherein the vehicle control signal includes one or more of a vehicle braking control signal, a vehicle steering control signal, and a vehicle throttling control signal.

5. The method of claim 2, wherein the vehicle environment data includes locations of one or more obstacles in the current vehicle environment.

6. The method of claim 5, wherein the first condition is satisfied in response to a determination by the controller that the predicted vehicle maneuver avoids the one or more obstacles identified in the current vehicle environment.

7. The method of claim 2, wherein the notification signal includes instructions related to performing the predicted vehicle maneuver.

8. The method of claim 2, wherein the method includes correlating, by the controller, the gaze position with the vehicle environment data and the vehicle characteristic data.

9. The method of claim 8, wherein the vehicle characteristic data includes a vehicle speed, a vehicle acceleration, and a vehicle steering wheel angle.

10. The method of claim 9, wherein the matched dataset includes the gaze position, a duration of the gaze position, the vehicle speed, the vehicle acceleration, the vehicle steering wheel angle, and a vehicle position.

11. An automotive vehicle, comprising:
    a body defining a passenger compartment and including a front windshield area, the body enclosing a propulsion system, a braking system, a steering system, and a wireless communication system;
    an eye-movement tracking system configured to capture eye movement data and including a virtual grid covering the front windshield area;
    a plurality of sensors configured to capture vehicle characteristic data; and
    a controller in communication with the plurality of sensors, the eye movement tracking system, and the wireless communication system, the controller configured to
    receive the eye movement data and the vehicle characteristic data;
    analyze the eye movement data and the vehicle characteristic data to temporally correlate the eye movement data and the vehicle characteristic data and generate a matched dataset;
    determine a predicted vehicle maneuver from the matched dataset; and
    transmit, using the wireless communication system, the predicted vehicle maneuver to a nearby vehicle using V2X communication.

12. The automotive vehicle of claim 11, wherein the controller is further configured to:
    receive vehicle environment data from the plurality of sensors to establish a current vehicle environment, wherein the vehicle environment data includes locations of one or more obstacles in the current vehicle environment;
    compare the vehicle environment data and the predicted vehicle maneuver to determine if a first condition is satisfied; and
    in response to satisfaction of the first condition, generate a notification signal and a vehicle control signal.

13. The automotive vehicle of claim 12, wherein the vehicle control signal includes one or more of a vehicle braking control signal, a vehicle steering control signal, and a vehicle throttling control signal.

14. The automotive vehicle of claim 12, wherein the first condition is satisfied in response to a determination by the controller that the predicted vehicle maneuver avoids the one or more obstacles identified in the current vehicle environment.

15. The automotive vehicle of claim 12, wherein the notification signal includes instructions related to performing the predicted vehicle maneuver.

16. A system for collecting and mapping eye movement data to vehicle data of a vehicle having a front windshield area, comprising:
    an eye-movement tracking system configured to capture eye movement data and including a virtual grid covering the front windshield area, wherein the virtual grid is divided into a plurality of uniquely identified grid areas for determining a gaze position;

a plurality of sensors configured to capture vehicle characteristic data; and a controller in communication with the plurality of sensors and the eye movement tracking system, the controller configured to receive the eye movement data, including the gaze position, and the vehicle characteristic data;

analyze the eye movement data and the vehicle characteristic data to temporally correlate the eye movement data and the vehicle characteristic data and generate a matched dataset; and determine a predicted vehicle maneuver from the matched dataset.

17. The system of claim 16, wherein the controller is further configured to:

receive vehicle environment data from the plurality of sensors to establish a current vehicle environment;

compare the vehicle environment data and the predicted vehicle maneuver to determine if a first condition is satisfied; and in response to satisfaction of the first condition, generate one or more of a notification signal and a vehicle control signal.

18. The system of claim 17, wherein the vehicle control signal includes one or more of a vehicle braking control signal, a vehicle steering control signal, and a vehicle throttling control signal.

19. The system of claim 16, wherein the first condition is satisfied in response to a determination by the controller that the predicted vehicle maneuver may be performed in the current vehicle environment.

20. The system of claim 16, wherein the notification signal includes instructions related to performing the predicted vehicle maneuver.

* * * * *